United States Patent
Takama et al.

(12)

(10) Patent No.: US 10,633,026 B2
(45) Date of Patent: Apr. 28, 2020

(54) VEHICLE SYSTEM AND VEHICLE CONTROLLER FOR CONTROLLING VEHICLE

(71) Applicant: DENSO International America, Inc., Southfield, MI (US)

(72) Inventors: Daisuke Takama, Southfield, MI (US); Takayuki Kimura, Kariya (JP)

(73) Assignee: DENSO International America, Inc., Southfield, MI (US)

( * ) Notice: Subject to any disclaimer, the term of this patent is extended or adjusted under 35 U.S.C. 154(b) by 358 days.

(21) Appl. No.: 15/875,005

(22) Filed: Jan. 19, 2018

(65) Prior Publication Data
US 2019/0225265 A1    Jul. 25, 2019

(51) Int. Cl.
*B62D 6/00* (2006.01)
*B62D 15/02* (2006.01)

(52) U.S. Cl.
CPC ......... *B62D 15/0255* (2013.01); *B62D 6/001* (2013.01); *B60Y 2300/18166* (2013.01)

(58) Field of Classification Search
None
See application file for complete search history.

(56) References Cited

U.S. PATENT DOCUMENTS

| 2011/0231088 | A1* | 9/2011 | Nishibashi | G01C 21/3658 701/533 |
| 2013/0013189 | A1* | 1/2013 | Nishibashi | G01C 21/3461 701/411 |
| 2013/0030691 | A1* | 1/2013 | Sumizawa | G01C 21/3658 701/410 |
| 2013/0103304 | A1* | 4/2013 | Nishibashi | G01C 21/3655 701/410 |
| 2013/0110394 | A1* | 5/2013 | Irie | G01C 21/3658 701/461 |
| 2015/0142303 | A1* | 5/2015 | Nishibashi | G01C 21/3655 701/428 |
| 2016/0178390 | A1* | 6/2016 | Nishibashi | G01C 21/3655 701/410 |

FOREIGN PATENT DOCUMENTS

WO    WO-2009150784 A1 * 12/2009 ......... G01C 21/3658

* cited by examiner

*Primary Examiner* — Shelley Chen (57) ABSTRACT

A vehicle system includes a road sensor mounted in a subject vehicle, the road sensor configured to detect a high occupancy vehicle (HOV) lane of a road on which the subject vehicle is traveling, and a processor coupled to the road sensor. The processor is programmed to receive a lane change request for the subject vehicle to enter or exit the HOV lane, determine, using the road sensor, whether an entrance or exit for the HOV lane is present, and upon determining that no entrance or exit for the HOV lane is present, suppress the lane change request.

20 Claims, 5 Drawing Sheets

VEHICLE SYSTEM AND VEHICLE CONTROLLER FOR CONTROLLING VEHICLE

TECHNICAL FIELD

The present disclosure relates to a vehicle system and a vehicle controller for controlling a vehicle.

BACKGROUND

In recent times, assisted driving and automatic driving have emerged as trending technologies. As one example of such technologies, a vehicle controller may perform an assisted lane change or an automatic lane change by controlling the steering system of a vehicle. However, there is a concern that with such technologies, the assisted or automatic lane change may not sufficiently account for local regulations regarding high occupancy vehicle (HOV) lanes.

SUMMARY

In an aspect of the present disclosure, a vehicle controller determines whether a lane change request should be suppressed based on detection of an HOV lane.

DETAILED DESCRIPTION

First Embodiment

A first embodiment of the present disclosure will be explained with reference to FIGS. 1 to 5.

Figures 1, 2:
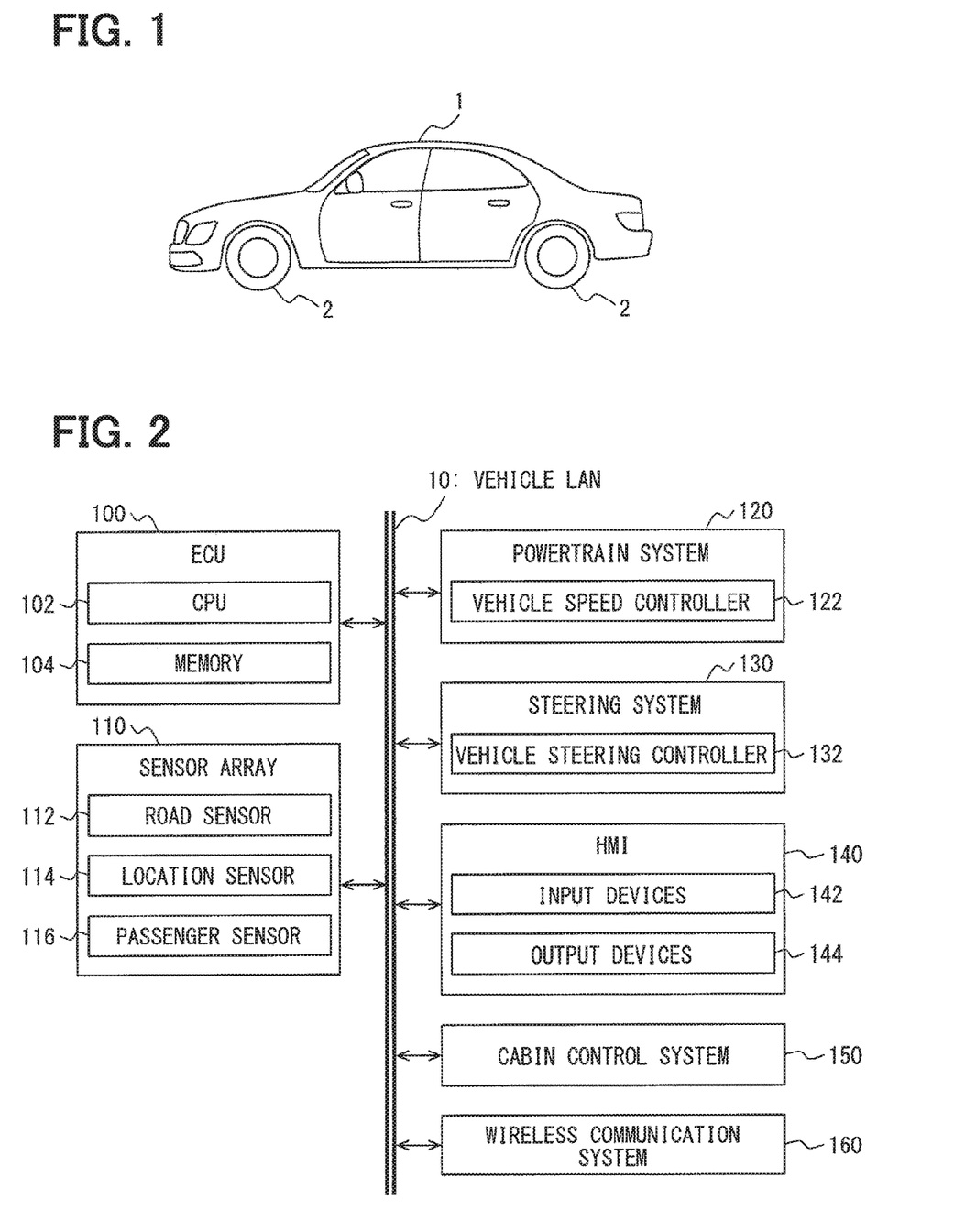
FIG. 1 is an overview of a vehicle.
FIG. 2 is a system view of a vehicle LAN.

FIG. 1 shows a subject vehicle 1 including a plurality of wheels 2. While FIG. 1 shows a sedan type passenger vehicle, this is not intended to be limiting. The present disclosure is equally applicable to all types of road vehicles, including trucks, busses, as well as specialized vehicles such as agricultural machinery.

The subject vehicle 1 includes a variety of on-board systems as shown in FIG. 2. Here, FIG. 2 is a system diagram, in which a vehicle local-area network (LAN) 10 serves as a network bus which interconnects an electronic control unit (ECU) 100, a sensor array 110, a powertrain system 120, a steering system 130, a human-machine interface (HMI) 140, a cabin control system 150, and a wireless communication system 160.

The ECU 100 is a processor which includes a central processing unit (CPU) 102 and a memory 104. The CPU 102 is preferably a microcomputer or microprocessor. The memory 104 is preferably a semiconductor memory such as random access memory (RAM), read only memory (ROM), flash memory, of a combination of these. The memory 104 has stored thereon instructions which program the CPU 102 to perform a variety of tasks as will be described later. In an alternative embodiment, the ECU 100 may be implemented as an off-board remote processor, such as through the use of a remote cloud computing server which communicates with the subject vehicle 1 via the wireless communication system 160. The ECU 100 serves as a vehicle controller which controls the subject vehicle 1. The ECU 100 and the subject vehicle 1 together form a vehicle system that provides lane change assistance as will be described below.

The sensor array 110 is a collection of various sensors, among which includes a road sensor 112, a location sensor 114, and a passenger sensor 116. Each of these sensors may be physically mounted in different locations of the subject vehicle 1. In addition, as shown in FIG. 2, the sensor array 110 is coupled to the ECU 100 through the vehicle LAN 10. In an alternative embodiment, the sensor array 110 may be directly connected to the ECU 100.

The powertrain system 120 controls the powertrain of the subject vehicle 1. For example, the powertrain system 120 may control the acceleration, deceleration, and braking of the subject vehicle 1. The powertrain system 120 includes a vehicle speed controller 122 which interfaces with external devices. In the present embodiment, the vehicle speed controller 122 receives command signals from the ECU 100 or other external controllers (not illustrated), and controls the speed of the subject vehicle 1 in accordance with those command signals.

The steering system 130 controls the steering (i.e., the heading) of the subject vehicle 1 by controlling at least one of the wheels 2 of the subject vehicle 1. The steering system 130 includes a vehicle steering controller 132 which interfaces with external devices. In the present embodiment, the vehicle steering controller 132 receives command signals from the ECU 100 or other external controllers, and controls the heading of the subject vehicle 1 in accordance with those command signals.

The HMI 140 allows a passenger to input information to the subject vehicle 1, and allows the passenger to receive information about the subject vehicle 1. The HMI 140 includes a plurality of input devices 142 and a plurality of output devices 144. The input devices 142 include, but are not limited to, a keyboard, a keypad, a touch screen, a voice input channel, as well as wired and wireless protocols for receiving user input from another device. For example, the input devices 142 may include a short range wireless transceiver which receives user input from a mobile device operated by the passenger. The output devices 144 include, but are not limited to, a display for visual output, a speaker for audio output, tactile feedback elements (e.g., embedded in a steering wheel or seat), as well as the above mentioned wired and wireless protocols, which may be used to output data to a mobile device operated by a passenger.

The cabin control system 150 controls various miscellaneous aspects of the subject vehicle 1, such as door locking and lighting. The wireless communication system 160 allows the subject vehicle 1 to communicate with other vehicles as well as infrastructure. The wireless communication system 160 may allow communication over a wide variety of protocols such as cellular, short range wireless, and so on.

While the system diagram of FIG. 2 shows each of the ECU 100, the sensor array 110, the powertrain system 120, the steering system 130, the HMI 140, the cabin control system 150, and the wireless communication system 160 as separate systems, this is not intended to limit the physical relationships between these systems. For example, the road sensor 112 of the sensor array 110 may be a front camera physically mounted on the front of the subject vehicle 1, while the location sensor 114 of the sensor array 110 may be physically mounted inside the dashboard of the subject vehicle 1. Similarly, each of the vehicle speed controller 122 and the vehicle steering controller 132 may be implemented as part of the ECU 100. In other words, while FIG. 2 shows a system layout, this does not limit the physical layout of the network. Additionally, while FIG. 2 shows the use of the vehicle LAN 10, this is merely illustrative and not intended to be limiting. Each of the system components may be directly connected to each other instead.

Next, each of the sensors in the sensor array 110 will be described.

The road sensor 112 detects an HOV lane of a road on which the subject vehicle 1 is travelling. In the present embodiment, the road sensor 112 is implemented as an optical camera which captures an optical signal of the road on which the subject vehicle 1 is travelling. The road sensor 112 outputs the optical signal of the road to the ECU 100. The road sensor 112 may be implemented as a front camera that acquires an optical signal of the road in front of the subject vehicle 1, or a surround view camera that acquires an optical signal of the road around the subject vehicle 1. In the case of a surround view camera, the road in front of the subject vehicle 1 is still captured.

The location sensor 114 includes a GPS receiver and a memory device that has stored thereon road information describing the road on which the subject vehicle 1 is travelling. In particular, in the present embodiment, the road information stored on the memory device of the location sensor 114 includes information describing the presence of an HOV lane as well as local regulations associated with the HOV lanes. Examples of local regulations will be described later. The location sensor 114 detects the current location of the subject vehicle 1 with the GPS receiver and outputs this data to the ECU 100 along with the road information stored on the memory device. In other words, the location sensor 114 outputs information about an HOV lane, similar to the road sensor 112. Accordingly, the location sensor 114 may be used in conjunction with the road sensor 112, and may be relied upon if, for example, the road sensor 112 is unable to accurately detect some aspect of the road due to low visibility. In an alternative embodiment, the location sensor 114 may be used as a road sensor in place of the road sensor 112.

The passenger sensor 116 is configured to detect a number of passengers in the subject vehicle 1. In the present embodiment, the passenger sensor 116 is an optical camera configured to acquire an optical signal of the interior of the subject vehicle 1, and based on this optical signal, the number of passengers in the subject vehicle 1 may be determined. The passenger sensor 116 outputs a signal representing the number of passengers (i.e., either the raw optical signal, or the number itself) to the ECU 100. In alternative embodiments, the passenger sensor 116 may be implemented as a seatbelt sensor that determines the number of passengers based on a number of seatbelts in the subject vehicle 1 which are engaged, or a weight sensor that determines the number of passengers by detecting a weight applied to each seat in the subject vehicle 1.

In the present embodiment, the subject vehicle 1 is configured to perform an assisted lane change in response to a lane change request. Here, "assisted lane change" refers to both fully autonomous (i.e., automatic) lane changes which are both initiated and performed by the subject vehicle 1, as well as semi-autonomous lane changes which are manually initiated by a passenger (e.g., through the use of a lane change signal lever) and then performed automatically by the subject vehicle 1. In the case of fully-autonomous lane changes, the lane change request is automatically created by an autonomous navigation system of the subject vehicle 1. In the case of semi-autonomous lane changes, the lane change request is created by the passenger (e.g., the actuation of a lane change signal lever). In addition, in the present embodiment, the assisted lane change is a single lane change away from the current lane that the subject vehicle 1 is travelling in, i.e., into an adjacent lane.

Figure 3A:
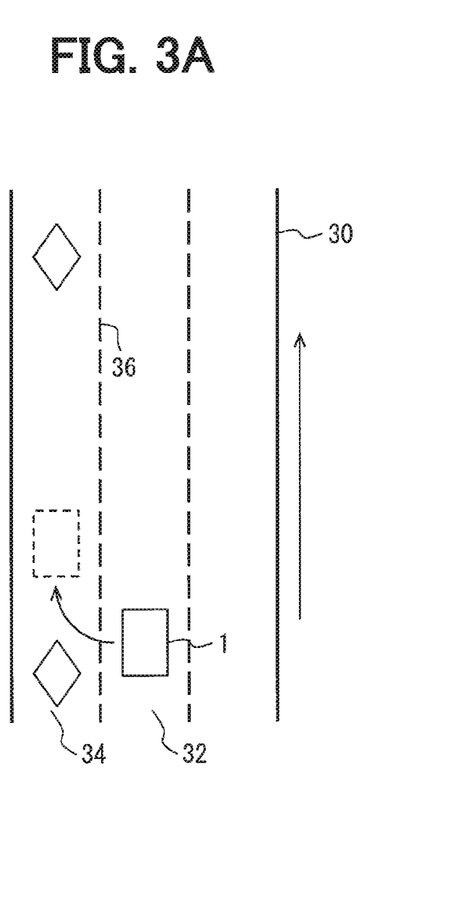
FIG. 3A shows a lane change request into an HOV lane when an entrance is present.
Figure 3B:
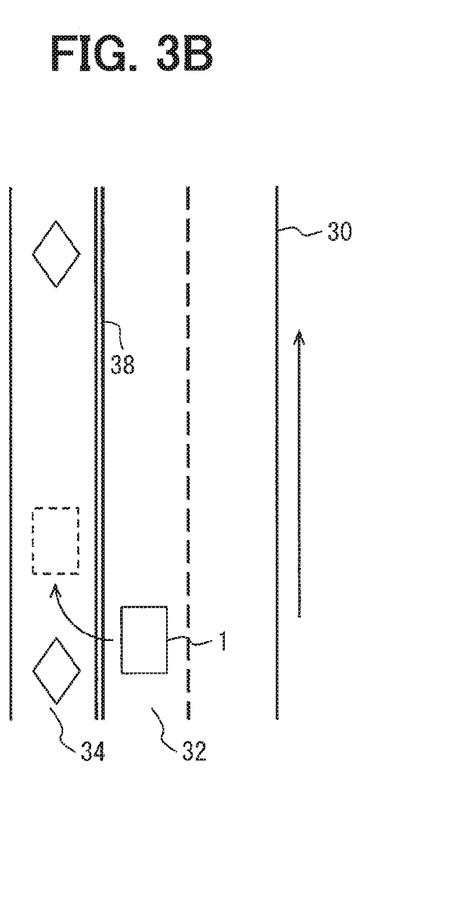
FIG. 3B shows a lane change request into an HOV lane when an entrance is not present.
Figure 4A:
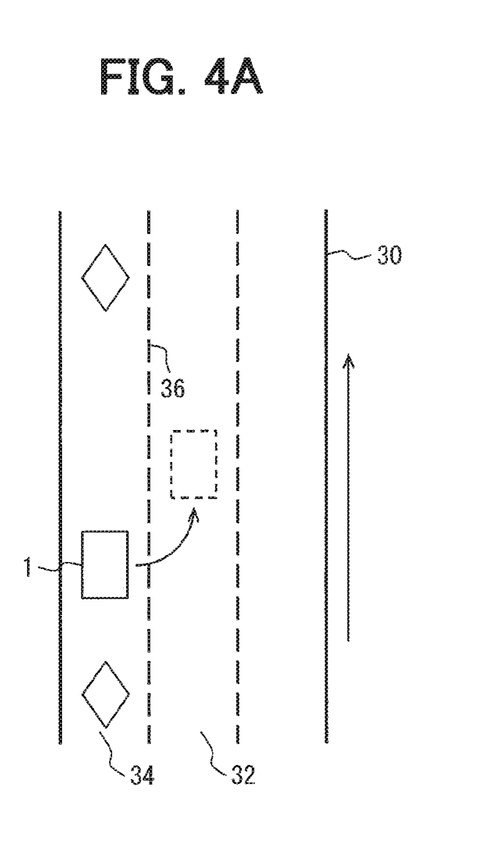
FIG. 4A shows a lane change request out of an HOV lane when an exit is present.
Figure 4B:
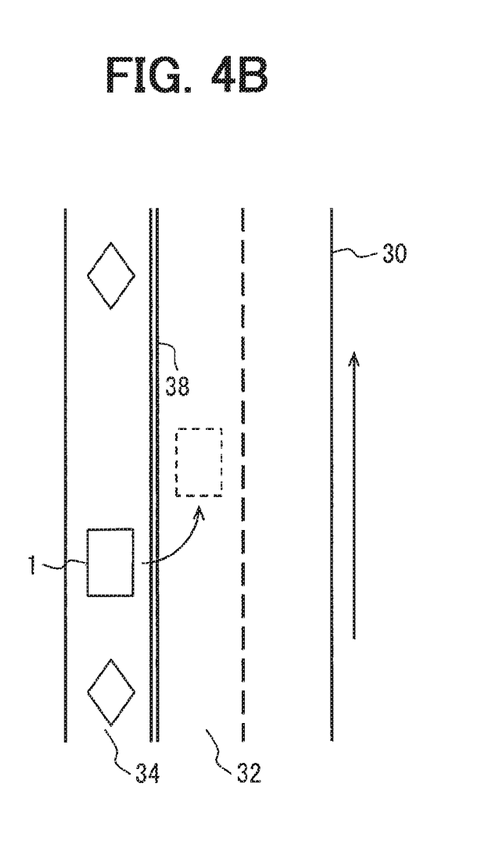
FIG. 4B shows a lane change request out of an HOV lane when an exit is not present.

In the present embodiment, in response to a lane change request, the ECU 100 is configured to perform a control process which accounts of local regulations related to HOV lanes, and may suppress the lane change request based on the outcome of this control process. When the lane change request is suppressed by the ECU 100, the assisted lane change is not performed. Specifically, in the present embodiment, in response to a lane change request for the subject vehicle 1 to enter or exit an HOV lane, the ECU 100 is configured to determine whether an entrance or exit of the HOV lane is present. FIGS. 3 and 4 illustrate non-limiting examples of entrances and exits for HOV lanes.

For instance, FIG. 3A illustrates the subject vehicle 1 travelling on a road 30 in a traffic lane 32. An adjacent HOV lane 34 is separated from the traffic lane 32 by a road surface marker 36. The direction of travel is upwards, as shown by the arrow. FIG. 3A illustrates a lane change request for the subject vehicle 1 to enter the HOV lane 34 from the traffic lane 32. In this case, the road surface marker 36 is a dashed line, indicating that entry into the HOV lane 34 from the traffic lane 32 is permitted. In other words, the presence of the road surface marker 36 corresponds to the presence of an entrance of the HOV lane 34.

FIG. 3B also illustrates a lane change request for the subject vehicle 1 to enter the HOV lane 34 from the traffic lane 32. However, in FIG. 3B, the adjacent HOV lane 34 is separated from the traffic lane 32 by a road surface marker 38. The road surface marker 38 is a pair of solid lines, indicating that entry into the HOV lane 34 from the traffic lane 32 is not permitted. In other words, the presence of the road surface marker 38 corresponds to the non-presence of an entrance of the HOV lane 34.

As another example, FIG. 4A illustrates the subject vehicle 1 travelling on a road 30 in an HOV lane 34. An adjacent traffic lane 32 is separated from the HOV lane 34 by a road surface marker 36. The direction of travel is upwards, as shown by the arrow. FIG. 4A illustrates a lane change request for the subject vehicle 1 to exit the HOV lane 34 into the traffic lane 32. In this case, the road surface marker 36 is a dashed line, indicating that exit out of the HOV lane 34 into the traffic lane 32 is permitted. In other words, the presence of the road surface marker 36 corresponds to the presence of an exit of the HOV lane 34.

FIG. 4B also illustrates a lane change request for the subject vehicle 1 to exit the HOV lane 34 into the traffic lane 32. However, in FIG. 4B, the adjacent traffic lane 32 is separated from the HOV lane 34 by a road surface marker 38. The road surface marker 38 is a pair of solid lines, indicating that exit out of the HOV lane 34 into the traffic lane 32 is not permitted. In other words, the presence of the road surface marker 38 corresponds to the non-presence of an exit of the HOV lane 34.

It should be noted that the above examples are not limiting, and a variety of entrances and exits to HOV lanes are contemplated in this disclosure. For instance, a road surface marker separating an HOV lane and a traffic lane may be a single solid line (indicating that entry or exit is not permitted), a dashed line paired with a solid line (indicating that only one of entry or exit is permitted), or any other type of marker consistent with local traffic regulations. As another alternative, the entrance or exit to an HOV lane may be configured as a fork in the lane. The road sensor 112 and the ECU 100 may be programmed as appropriate to detect any or all of numerous different types of HOV lanes, HOV lane entrances, and HOV lane exits.

Figure 5:
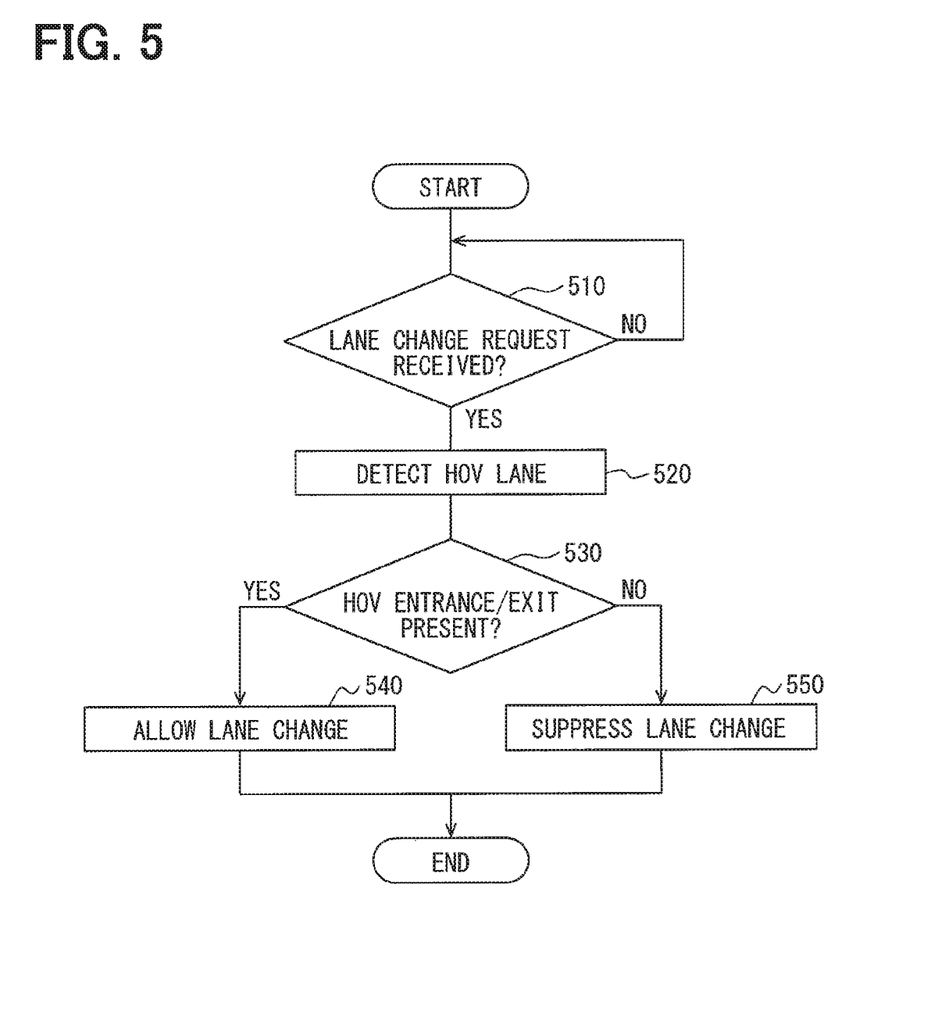
FIG. 5 shows a flow chart of a control process.

As mentioned above, the ECU 100 is configured to perform a control process which accounts of local regulations related to HOV lanes, and may suppress the lane change request based on the outcome of this control process. FIG. 5 illustrates an example of this control process.

The control process shown in FIG. 5 begins at step 510, where the ECU 100 determines whether a lane change request for the subject vehicle 1 to enter or exit an HOV lane has been received. In the case of a fully autonomous driving mode, this lane change request may be generated by an external controller (not illustrated) acting as an autonomous navigation system of the subject vehicle 1. In the case of a semi-autonomous driving mode, this lane change request may be generated when a passenger operates a lane change signal lever. The lane change request does not need to be sent directly the ECU 100. Instead, for example, the ECU 100 may passively or indirectly detect whether a lane change request is generated in another controller (such as an autonomous driving controller). If the ECU 100 determines that a lane change request has not been received ("NO" at step 510), the control process returns to the beginning and repeats step 510. If the ECU 100 determines that a lane change request for entering or exiting an HOV lane has been received ("YES" at step 510), the process continues to step 520.

At step 520, the ECU 100 controls the road sensor 112 to detect the HOV lane in connection with the received lane change request, i.e., the target HOV lane for the subject vehicle 1 to enter or exit. For example, if the road sensor 112 is implemented as an optical camera, then at step 520, an image of the HOV lane ahead of the subject vehicle 1 is captured and analyzed. Then, the process continues to step 530.

At step 530, the ECU 100 determines whether an entrance or exit is present for the HOV lane. More specifically, the ECU 100 determines whether an entrance is present when the lane change request received at step 510 is a request to enter the HOV lane, while the ECU 100 determines whether an exit is present when the lane change request received at step 510 is a request to exit the HOV lane. For example, if the road sensor 112 is implemented as an optical camera, then at step 520, the ECU 100 determines whether an entrance or exit is present based on the optical image of the HOV lane captured by the road sensor 112. This may be done by determining whether a road surface marker separating the HOV lane and an adjacent traffic lane indicates that entry or exit is permitted in accordance with local traffic regulations, for instance as shown in the examples of FIGS. 3 and 4. Alternatively, if the location sensor 114 is used as the road sensor 112, the ECU 100 may use location information in combination with road information to determine whether an entrance or exit is present for the HOV lane.

If the ECU 100 determines that an entrance or exit is present for the HOV lane ("YES" at step 530), the process continues to step 540. At step 540, the ECU 100 allows the requested lane change to be performed. Step 540 may include the ECU 100 sending an explicit signal to an external controller (i.e., explicit permission), or may be performed by the ECU 100 simply remaining silent (i.e., implicit permission). The specific actions performed at step 540 are not intended to be limited and may be designed as appropriate depending on how the ECU 100 is integrated with external controllers.

If the ECU 100 determines that an entrance or exit is not present for the HOV lane ("NO" at step 530), the process continues to step 550. At step 550, the ECU 100 suppresses the requested lane change, i.e., prohibits the requested lane change from being performed. Step 550 may include the ECU 100 sending an explicit signal to an external controller (i.e., explicit prohibition), or may be performed by the ECU 100 simply remaining silent (i.e., implicit prohibition). The specific actions performed at step 540 are not intended to be limited and may be designed as appropriate depending on how the ECU 100 is integrated with external controllers.

In a preferential aspect, at step 550, the ECU 100 may use the output devices 144 of the HMI 140 to notify a passenger in the subject vehicle 1 of why the lane change request was suppressed. This is preferably performed when the lane change request was manually initiated by the passenger, i.e., in a semi-autonomous driving mode, so the passenger would not be alarmed or confused. For instance, the ECU 100 may use the output devices 144 to perform any one or more of displaying a text message, displaying an image, outputting a voice message, or outputting a warning sound indicating why the lane change request was suppressed.

In another preferential aspect, the ECU 100 may use the input devices 142 of the HMI 140 to allow a passenger to input a command to override the suppression of the lane change request. For example, the ECU 100 may have mistakenly suppressed the lane change request due to an incorrect determination at step 530, in which case a passenger may override the suppression to allow the requested lane change to be performed anyway. This may be a verbal command, a button actuation, or any other kind of input from a passenger.

Second Embodiment

A second embodiment of the present disclosure will be described with reference to FIG. 6. Elements which are similar to or identical to those of the previous embodiment are denoted with the same reference numerals, and descriptions thereof may be omitted for brevity. In the second embodiment, the ECU 100 is configured to perform a control process which further considers the number of passengers in the subject vehicle 1 prior to allowing a requested lane change to be performed.

Figure 6:
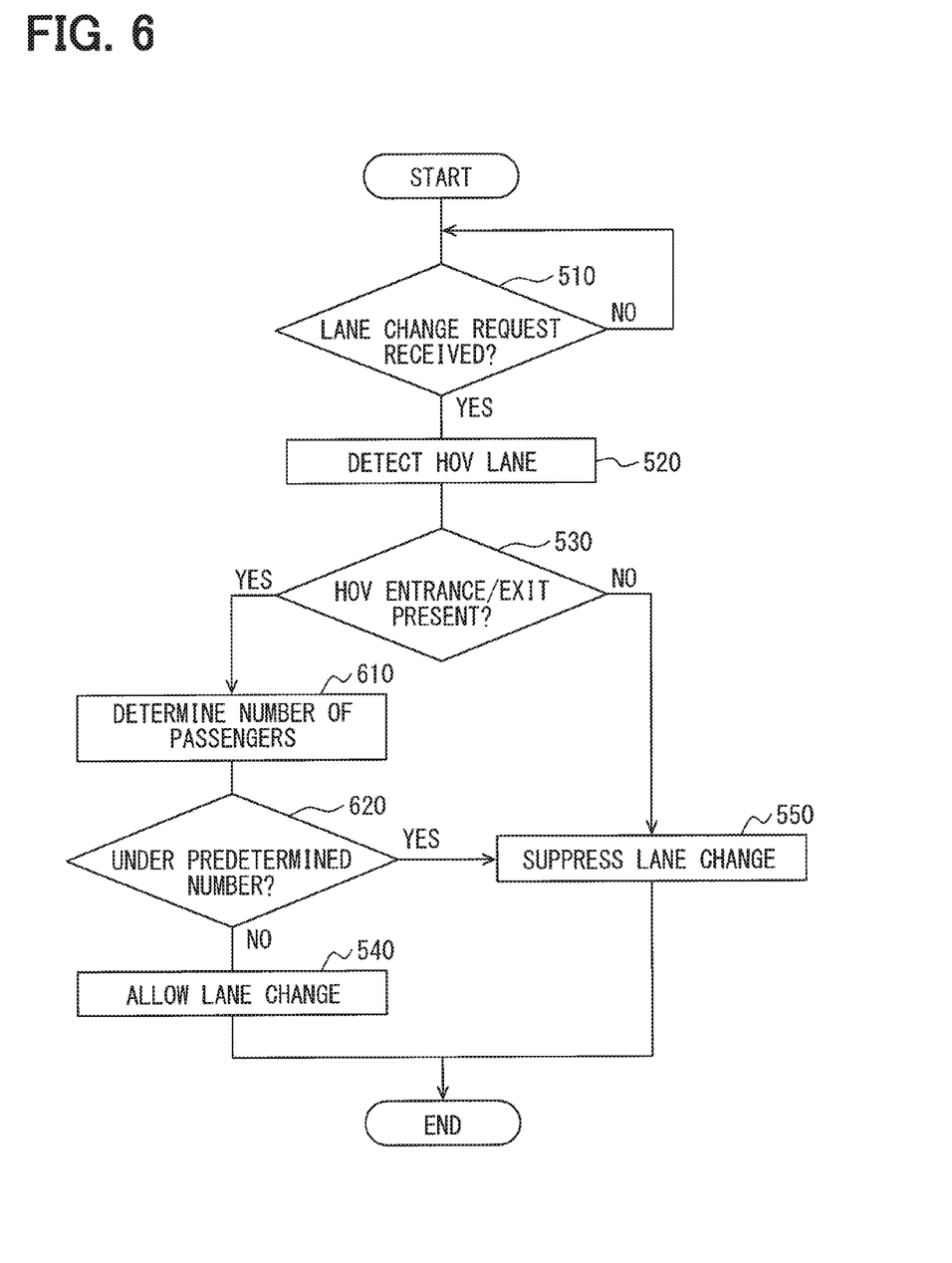
FIG. 6 shows a flow chart of a control process.

In particular, as shown in FIG. 6, if the ECU 100 determines that an entrance or exit is present for the HOV lane ("YES" at step 530), the process continues to step 610. At step 610, the ECU 100 uses the passenger sensor 116 to determine the number of passengers in the subject vehicle 1. For example, if the passenger sensor 116 is implemented as an optical camera, then at step 610, the ECU 100 determines the number of passengers present based on the optical image of the interior of the subject vehicle 1. After determining the number of passengers, the process continues to step 620.

At step 620, the ECU 100 determines whether the number of passengers in the subject vehicle 1 is less than a predetermined number of passengers required by local regulations for a vehicle to enter the destination lane of the lane change request. For example, if the destination lane is an HOV lane (i.e., the lane change request is a request for the subject vehicle 1 to enter an HOV lane), the predetermined number of passengers may be two, or three, depending on local regulations. If the destination lane is a standard traffic lane, the predetermined number of passengers is zero, i.e., no requirement as to the number of passengers. In this case, the determination at step 620 is always "NO" (since the number of passengers cannot be below zero).

If the ECU 100 determines that the number of passengers in the subject vehicle 1 is not less than the predetermined number of passengers ("NO" at step 620), then the process continues to step 540 as in the first embodiment. If the ECU 100 determines that the number of passengers in the subject vehicle 1 is less than the predetermined number of passengers ("YES" at step 620), then the process continues to step 550 as in the first embodiment.

Other Embodiments

The present disclosure is described with reference to the above embodiments, but these embodiments are not intended to be limiting. A variety of modifications which do not depart from the gist of the present disclosure are contemplated.

In the above described embodiments, the control processes of FIGS. 5 and 6 are depicted with a plurality of steps for completeness, but these steps may be combined, separated, or omitted entirely as appropriate. For example, in the above described embodiments, the ECU 100 determines whether a lane change request for entering or exiting an HOV lane is received at step 510. However, this is not limited to being performed in one step. Instead, for instance, the ECU 100 may first determine whether a generic lane change request is received, then determine whether the lane change request is for entering or exiting an HOV lane, e.g., by using the road sensor 112.

In the above described embodiments, the ECU 100 is described as being separate from external controllers responsible for semi-autonomous or fully autonomous driving. However, this is not intended to be limiting, and the ECU 100 itself may be configured to perform some or all aspects of semi-autonomous or fully autonomous driving. In this case, the ECU 100 directly receives or generates lane change requests, and interfaces with the powertrain system 120 and the steering system 130 to control the speed and heading of the subject vehicle 1.

It should be noted that the configuration of the on-board systems of the subject vehicle 1 shown in FIG. 2 is exemplary in nature and components may be omitted where not needed.

The present disclosure includes implementation as a vehicle controller, which is a processor that includes a CPU and a memory. The vehicle controller is programmed to execute the control processes described with respect to the above described embodiments.

The invention claimed is:

1. A vehicle system, comprising:
a road sensor mounted in a subject vehicle, the road sensor configured to detect a high occupancy vehicle (HOV) lane of a road on which the subject vehicle is traveling; and
a processor coupled to the road sensor, wherein
the processor is programmed to
receive a lane change request for the subject vehicle to enter or exit the HOV lane,
determine, using the road sensor, whether an entrance or exit for the HOV lane is present, and
upon determining that no entrance or exit for the HOV lane is present, suppress the lane change request.

2. The vehicle system of claim 1, wherein
the road sensor includes a front camera configured to acquire an optical signal of the road in front of the subject vehicle.

3. The vehicle system of claim 1, wherein
the road sensor includes a surround view camera configured to acquire an optical signal of the road around the subject vehicle.

4. The vehicle system of claim 1, wherein
the road sensor is a location sensor configured to detect a location of the subject vehicle, and includes a memory device having stored thereon road information describing the HOV lane of the road on which the subject vehicle is traveling.

5. The vehicle system of claim 1, further comprising:
a vehicle passenger sensor configured to detect a number of passengers in the subject vehicle, wherein
the lane change request is a request for the subject vehicle to enter the HOV lane, and
the processor is further programmed to
determine, using the vehicle passenger sensor, whether the number of passengers is under a predetermined number, and
upon determining that the number of passengers is under the predetermined number, suppress the lane change request.

6. The vehicle system of claim 5, wherein
the vehicle passenger sensor includes a driver monitoring camera configured to acquire an optical signal of an interior of the subject vehicle.

7. The vehicle system of claim 5, wherein
the vehicle passenger sensor includes a seatbelt sensor that determines the number of passengers based on a number of seatbelts in the subject vehicle which are engaged.

8. The vehicle system of claim 5, wherein
the vehicle passenger sensor includes a weight sensor that determines the number of passengers by detecting a weight applied to each seat in the subject vehicle.

9. The vehicle system of claim 1, further comprising:
an output device coupled to the processor, wherein
the processor is further programmed to, upon suppressing the lane change request, operate the output device to notify a passenger of why the lane change request was suppressed.

10. The vehicle system of claim 9, further comprising:
an input device coupled to the processor, wherein
the processor is further programmed to receive an input from the passenger through the input device to override the suppression of the lane change request.

11. A vehicle controller for controlling a subject vehicle, comprising:
a central processing unit; and
a memory coupled to the central processing unit, wherein
the central processing unit is coupled to a road sensor mounted in the subject vehicle, the vehicle size sensor configured to detect a high occupancy vehicle (HOV) lane of a road on which the subject vehicle is traveling, and
the central processing unit is programmed to
receive a lane change request for the subject vehicle to enter or exit the HOV lane,
determine, using the road sensor, whether an entrance or exit for the HOV lane is present, and
upon determining that no entrance or exit for the HOV lane is present, suppress the lane change request.

12. The vehicle controller of claim 11, wherein
the road sensor includes a front camera configured to acquire an optical signal of the road in front of the subject vehicle.

13. The vehicle controller of claim 11, wherein
the road sensor includes a surround view camera configured to acquire an optical signal of the road around the subject vehicle.

14. The vehicle controller of claim 11, wherein
the road sensor is a location sensor configured to detect a location of the subject vehicle, and includes a memory device having stored thereon road information describing the HOV lane of the road on which the subject vehicle is traveling.

15. The vehicle controller of claim 11, wherein
the central processing unit is coupled to a vehicle passenger sensor mounted in the subject vehicle, the vehicle passenger sensor being configured to detect a number of passengers in the subject vehicle,
the lane change request is a request for the subject vehicle to enter the HOV lane, and
the central processing unit is further programmed to
determine, using the vehicle passenger sensor, whether the number of passengers is under a predetermined number, and
upon determining that the number of passengers is under the predetermined number, suppress the lane change request.

16. The vehicle controller of claim 15, wherein
the vehicle passenger sensor includes a driver monitoring camera configured to acquire an optical signal of an interior of the subject vehicle.

17. The vehicle controller of claim 15, wherein
the vehicle passenger sensor includes a seatbelt sensor that determines the number of passengers based on a number of seatbelts in the subject vehicle which are engaged.

18. The vehicle controller of claim 15, wherein
the vehicle passenger sensor includes a weight sensor that determines the number of passengers by detecting a weight applied to each seat in the subject vehicle.

19. The vehicle controller of claim 11, wherein
the central processing unit is further coupled to an output device mounted in the subject vehicle, and
the central processing unit is further programmed to, upon suppressing the lane change request, operate the output device to notify a passenger of why the lane change request was suppressed.

20. The vehicle controller of claim 19, wherein
the central processing unit is further coupled to an input device mounted in the subject vehicle, and
the central processing unit is further programmed to receive an input from the passenger through the input device to override the suppression of the lane change request.

* * * * *